(12) United States Patent
Zampieri et al.

(10) Patent No.: US 12,404,045 B2
(45) Date of Patent: Sep. 2, 2025

(54) UNMANNED AERIAL VEHICLE

(71) Applicant: FLYABILITY SA, Lausanne (CH)

(72) Inventors: Stefano Zampieri, Lausanne (CH);
Orsika Bojtar, Pully (CH); Ludovic Daler, Chardonne (CH)

(73) Assignee: FLYABILITY SA, Lausanne (CH)

( * ) Notice: Subject to any disclaimer, the term of this patent is extended or adjusted under 35 U.S.C. 154(b) by 0 days.

(21) Appl. No.: 18/706,133

(22) PCT Filed: Nov. 7, 2022

(86) PCT No.: PCT/IB2022/060691
§ 371 (c)(1),
(2) Date: Apr. 30, 2024

(87) PCT Pub. No.: WO2023/079523
PCT Pub. Date: May 11, 2023

(65) Prior Publication Data
US 2024/0425210 A1 Dec. 26, 2024

(30) Foreign Application Priority Data
Nov. 5, 2021 (IT) .................. 102021000028253

(51) Int. Cl.
*B64U 10/13* (2023.01)
*B64U 20/30* (2023.01)
*B64U 101/26* (2023.01)

(52) U.S. Cl.
CPC ............ *B64U 10/13* (2023.01); *B64U 20/30* (2023.01); *B64U 2101/26* (2023.01)

(58) Field of Classification Search
CPC .... B64U 10/13; B64U 20/30; B64U 2101/26; B64U 2101/29; B64U 30/299;
(Continued)

(56) References Cited

U.S. PATENT DOCUMENTS 3,633,849 A * 1/1972 Kling .................. B64C 27/20
244/23 C
4,505,346 A * 3/1985 Mueller ................ B62D 57/04
446/178
(Continued)

FOREIGN PATENT DOCUMENTS

CN 110196025 A 9/2019
CN 110609087 A 12/2019
(Continued)

OTHER PUBLICATIONS

Search report from International Patent Application PCT/IB2022/060691, dated Jan. 18, 2023.
(Continued)

*Primary Examiner* — Medhat Badawi
(74) *Attorney, Agent, or Firm* — Carmel Patent Agency; Robert Ballarini (57) ABSTRACT

An unmanned aerial vehicle for non-destructive testing includes: an outer protective cage, a propulsion system mounted inside the outer protective cage and fixed thereto, an arm having a first end attached to the outer protective cage, and a non-destructive testing sensor mounted at a second end of the arm. The arm extends outward from the outer protective cage, the arm having a length between 1 and 50 percent of an overall linear dimension of the outer protective cage.

18 Claims, 8 Drawing Sheets

(58) Field of Classification Search
CPC .. B64U 2101/30; G01N 29/225; G01N 29/26; G01N 29/265; G01N 29/28; G01N 2291/0258; B64C 27/006
See application file for complete search history.

(56) References Cited

U.S. PATENT DOCUMENTS

| | | | | |
|---|---|---|---|---|
| 6,402,088 | B1* | 6/2002 | Syrovy | B64C 27/28 244/17.11 |
| 6,432,057 | B1* | 8/2002 | Mazess | A61B 8/0875 600/459 |
| 6,537,246 | B1* | 3/2003 | Unger | A61K 49/223 604/82 |
| 7,273,195 | B1* | 9/2007 | Golliher | A63H 27/12 244/17.11 |
| 8,147,289 | B1* | 4/2012 | Lee | A63H 27/12 446/36 |
| D659,771 | S* | 5/2012 | Seydoux | D21/441 |
| 8,528,854 | B2* | 9/2013 | Yan | A63H 33/005 244/119 |
| 8,695,919 | B2* | 4/2014 | Shachor | B64U 10/60 244/17.11 |
| 9,061,558 | B2* | 6/2015 | Kalantari | A63H 33/005 |
| 9,889,930 | B2* | 2/2018 | Welsh | A63H 27/12 |
| 10,112,694 | B2* | 10/2018 | Yan | A63H 33/005 |
| 10,118,697 | B2* | 11/2018 | Weissenberg | B64U 30/293 |
| 10,165,256 | B2* | 12/2018 | Grenier | B64C 29/0025 |
| 10,252,795 | B2* | 4/2019 | Kornatowski | B64C 27/006 |
| 10,252,800 | B1* | 4/2019 | Dorsey | G01N 29/265 |
| 10,413,763 | B2* | 9/2019 | Won | A62C 3/0242 |
| 10,435,147 | B2* | 10/2019 | Allen | B64C 27/57 |
| 10,676,331 | B1* | 6/2020 | Dorsey | B66D 3/26 |
| D890,267 | S* | 7/2020 | Liao | D21/443 |
| 10,870,487 | B2* | 12/2020 | McCullough | B64D 25/12 |
| 10,988,241 | B2* | 4/2021 | Santangelo | B64C 25/58 |
| 11,021,240 | B2* | 6/2021 | Lee | B64U 10/80 |
| 11,148,808 | B2* | 10/2021 | Wiggerich | B64U 30/26 |
| 11,260,971 | B2* | 3/2022 | Weller | B64U 10/13 |
| 11,541,999 | B2* | 1/2023 | Atamanov | B64C 11/48 |
| 11,649,048 | B2* | 5/2023 | Hada | B64U 30/20 244/17.23 |
| 11,708,160 | B2* | 7/2023 | Briod | B64U 50/30 244/17.23 |
| 11,905,005 | B2* | 2/2024 | Cappelleri | G05D 1/654 |
| 11,932,427 | B1* | 3/2024 | Kuga | B64U 30/20 |
| 11,975,864 | B2* | 5/2024 | Hartkop | B64U 20/30 |
| D1,041,576 | S* | 9/2024 | Xiao | D21/468 |
| 12,091,171 | B2* | 9/2024 | Arnold | B64C 1/08 |
| 12,134,488 | B2* | 11/2024 | Sidoti | B64U 30/20 |
| 12,145,753 | B2* | 11/2024 | Bitar | B60L 50/60 |
| 2006/0055399 | A1* | 3/2006 | Georgeson | G01N 29/28 324/232 |
| 2007/0215750 | A1* | 9/2007 | Shantz | A63H 27/12 244/17.23 |
| 2009/0075551 | A1* | 3/2009 | Chui | A63H 27/12 446/36 |
| 2010/0224723 | A1* | 9/2010 | Apkarian | B64U 30/24 244/65 |
| 2014/0014767 | A1* | 1/2014 | Yan | A63H 30/04 244/119 |
| 2014/0131507 | A1* | 5/2014 | Kalantari | B60F 5/02 244/2 |
| 2015/0111277 | A1* | 4/2015 | Hamman | A61M 1/3693 422/534 |
| 2015/0274294 | A1* | 10/2015 | Dahlstrom | B05B 13/0278 239/722 |
| 2015/0360776 | A1* | 12/2015 | Briod | B64C 17/00 244/23 A |
| 2016/0001875 | A1* | 1/2016 | Daler | B64U 10/13 244/17.11 |
| 2016/0101368 | A1* | 4/2016 | Rehkemper | A63H 27/12 446/58 |
| 2016/0122016 | A1* | 5/2016 | Mintchev | B64U 30/293 244/17.23 |
| 2016/0137293 | A1* | 5/2016 | Santangelo | B64C 25/32 244/50 |
| 2016/0280359 | A1* | 9/2016 | Semke | B64U 60/60 |
| 2016/0375983 | A1* | 12/2016 | Yan | G05D 1/0011 701/4 |
| 2017/0043869 | A1* | 2/2017 | Howard | B64U 10/14 |
| 2017/0050726 | A1* | 2/2017 | Yamada | B64U 60/60 |
| 2017/0233072 | A1* | 8/2017 | Chang | B64U 50/18 244/2 |
| 2017/0291697 | A1* | 10/2017 | Kornatowski | B64U 30/293 |
| 2017/0305547 | A1* | 10/2017 | Tamkin, Sr. | G08G 5/57 |
| 2018/0057135 | A1* | 3/2018 | Yan | A63H 15/06 |
| 2018/0118337 | A1* | 5/2018 | Viel | B08B 3/024 |
| 2018/0257774 | A1* | 9/2018 | Volpi | B64D 47/00 |
| 2018/0339768 | A1* | 11/2018 | Wang | B64U 30/26 |
| 2019/0337616 | A1* | 11/2019 | Benedict | B64C 27/52 |
| 2019/0366375 | A1* | 12/2019 | Thompson | B05B 12/16 |
| 2020/0174129 | A1* | 6/2020 | Abdelkader | G01B 17/02 |
| 2020/0182835 | A1* | 6/2020 | Hafenrichter | G01N 29/265 |
| 2020/0189712 | A1* | 6/2020 | Briod | B64U 10/13 |
| 2020/0216173 | A1* | 7/2020 | Suefuku | A47L 1/02 |
| 2021/0053678 | A1* | 2/2021 | Schütz | B60S 1/56 |
| 2021/0061463 | A1* | 3/2021 | Briod | B60L 50/60 |
| 2021/0237897 | A1* | 8/2021 | Gury | B64U 20/70 |
| 2021/0273422 | A1* | 9/2021 | Lavoie | H02G 1/02 |
| 2021/0311502 | A1* | 10/2021 | Ghio | B64U 10/16 |
| 2021/0339845 | A1* | 11/2021 | Milan | B64U 20/30 |
| 2022/0097865 | A1* | 3/2022 | Sidoti | B64U 30/299 |
| 2022/0119109 | A1* | 4/2022 | Lee | B64U 10/13 |
| 2022/0134217 | A1* | 5/2022 | Sohn | A63F 9/143 463/6 |
| 2022/0194578 | A1* | 6/2022 | Litton | G05D 1/101 |
| 2022/0380044 | A1* | 12/2022 | Arnold | B64U 20/30 |
| 2022/0411052 | A1* | 12/2022 | Angelucci | B64U 20/87 |
| 2023/0060888 | A1* | 3/2023 | Yan | B64C 39/024 |
| 2023/0097672 | A1* | 3/2023 | Saez | B25J 15/0491 483/58 |
| 2024/0425210 | A1* | 12/2024 | Zampieri | B64C 27/006 |

FOREIGN PATENT DOCUMENTS

| | | |
|---|---|---|
| DE | 102015110466 A1 | 1/2017 |
| FR | 3077057 A1 | 7/2019 |
| FR | 3087271 A1 | 4/2020 |
| GB | 2569219 A | 6/2019 |
| KR | 101937156 B1 | 1/2019 |
| KR | 102083132 B1 | 2/2020 |
| WO | 2012013878 A1 | 2/2012 |
| WO | 2019050401 A1 | 3/2019 |
| WO | 2019190325 A1 | 10/2019 |
| WO | 2020254526 A1 | 12/2020 |
| WO | 2021010907 A2 | 1/2021 |

OTHER PUBLICATIONS

Mattar et al. "Development of a Wall-Sticking Drone for Non-Destructive Ultrasonic and Corrosion Testing" MDPI, Drones 2018, 2, 8; doi:10.3390/drones2010008.

"Terra UT Drone-Ultrasonic Thickness Measurements with drone" https://www.technologycatalogue.com/product_service/terra-ut-drone-ultrasonic-thickness-measurements-drone, Jan. 8, 2021.

* cited by examiner

UNMANNED AERIAL VEHICLE

TECHNICAL FIELD

The invention relates to an unmanned aerial vehicle (hereinafter also referred to as "UAV") for performing non-destructive testing (hereinafter also referred to as "NDT") of structures.

BACKGROUND ART

Non-destructive testing of structures involves thoroughly examining a structure without harming it or requiring significant disassembly thereof. Various types of NDT sensors may be utilized to collect data regarding the structure from which internal flaws can be identified. The data acquired by the sensors is typically processed by a processing unit, and the processed data may be presented to a user via a display.

Among the structures that are routinely non-destructively tested, there are certain which pose significant challenges in testing, such as cargo holds, bridges, dams, offshore platforms, oil refineries, power plants, chemical processing plants, high rise buildings, just to name a few.

In-person human-based inspections of such structures can be time consuming, expensive, complicated and often dangerous for an individual to perform. Thus, a need exists in the industry to address such a problem.

A device for non-destructively checking structures and, for example, measuring the thicknesses of structures using an ultrasonic probe is known from WO2012/013878. The device comprises a drone, which is capable of hovering flight and which can preferably be manually and remotely piloted by an operator using a remote control, as well as an onboard measurement probe which is connected to the drone by connection means.

The connection means enable the measurement probe, in contact with a surface of a structure to be checked, to be positioned and temporarily immobilized while piloting the drone. However, during hovering of the drone, contact between the drone and the surface of the structure may become unstable, reducing the accuracy of measurements carried out with the probe.

A UAV suitable for providing a more stable contact in particular with a vertical wall is known from WO2019/050401. This UAV comprises a body and rotors, an arm end, a first leg end and a second leg end intersected by a front plane and adapted for together contacting the wall at three spaced-apart positions. Advantageously, an inspection device, such as an ultrasonic sensor, may be attached to the arm and adapted for measuring a wall property.

The known aerial vehicles cited above are beneficial for inspecting locations that otherwise would be hard to reach for humans. However, inspections using such aerial vehicles are still complicated and time-consuming. A reason for such inadequacy is the difficulty to precisely position any measurement probe or sensor in the desired target location on the surface of the structure to be inspected.

A further limitation of these known aerial vehicles is that, in harsh environments, they may not withstand impacts with external objects without deterioration of the flight propulsion system.

An aerial vehicle suitable for withstanding collisions with the environment is known from WO2019/048439 or US2021/061463. This aerial vehicle includes an inner frame, an inner flight propulsion system mounted on the inner frame, an outer frame, a gimbal system comprising at least two rotational couplings coupling the inner propulsion system to the outer frame, a control system, a power source, and an outer frame actuation system configured to actively orient the outer frame with respect to the inner frame.

Advantageously, the outer frame protects the components mounted in this known aerial vehicle from being damaged upon impact with external objects. However, it is evident that the outer frame rotational coupling and actuation systems inevitably increase the size and complexity of the aerial vehicle. On the contrary, it would be desirable to provide an aerial vehicle that is more compact, thereby facilitating access to narrow environments.

Besides the problems set out with reference to the prior art cited above, it should be noted that performing NDT on the surface of a structure may be further complicated by the presence of oxidation, rust, or contaminants such as general soiling, carbon, grease, etc. on the structure surface.

A method addressing such a problem is known from WO2019/190325. This method is especially adapted for inspecting and manipulating a beam at a lower side of a roof or deck, using a UAV. The UAV comprises an inspection tool for inspecting a portion of the beam, and a manipulation tool in the form of cleaning equipment for cleaning a portion of the beam. The method comprises, when the UAV is in a hanging position in which the UAV is supported on the beam: operating the cleaning equipment to clean a portion of the beam, positioning the inspection tool at the cleaned location of the beam, and inspecting said cleaned location using the inspection tool.

While this known solution is especially adapted for inspecting and manipulating a beam, it is evident that it is not optimal for inspecting structures that are different from a beam. Moreover, positioning the inspection tool at the cleaned location of the beam may be difficult and time consuming because it requires propelling the UAV along the longitudinal direction of the beam.

Further examples of UAVs are disclosed in GB2569219A, U.S. Pat. No. 10,112,694B2, US2021/339845A1 or US2018/339768A1.

SUMMARY OF THE INVENTION

The technical problem addressed by the present invention is to provide a UAV and possibly a method for performing non-destructive testing, NDT, that are structurally and functionally configured to at least partially overcome one or more of the disadvantages set out with reference to the prior art cited above.

Within this problem, a first objective of the invention is to provide a robust UAV capable of withstanding impacts with external objects without deterioration of its propulsion system or sensors.

A second objective of the invention is to provide a UAV capable of performing highly accurate NDT of structures in precise locations thereof.

A further objective of the invention is to provide a UAV able to maintain stable contact with the surface of a structure.

It is also an objective of the invention to provide a versatile UAV suitable for performing NDT of a wide range of structures without being limited by the spatial orientations of their surfaces.

According to an aspect of the invention, this problem is solved and these objectives are reached by providing a UAV, more particularly a UAV for performing NDT of structures. As used herein, the term "structure" is to be understood in a broad sense not only in reference to buildings but also other types of structures, such as aircraft structures, cargo holds, fuel tanks, sewers, electrical power grids, just to name a few.

The UAV may comprise a propulsion system. As used herein, the term "propulsion system" refers preferably to a flight propulsion system, comprising for instance a body and a number of rotors supported by the body.

The UAV may further comprise an outer protective cage. The outer protective cage may define two separate spaces, one inside and the other one outside the outer protective cage. The propulsion system may be mounted inside the outer protective cage. Additionally, the outer protective cage may be fixed to the propulsion system (or the body thereof), preferably in a rigid manner.

Advantageously, the outer protective cage surrounds and protects the propulsion system from impacts with external objects, including for example impacts with the surface of a structure to be non-destructively tested by the UAV. To better absorb impact energy, the outer protective cage may comprise a plurality of beams connected to each other to form a grid of polygons or a geodesic structure. Moreover, the outer protective cage may have an at least partially rounded outer shape, for example an at least partially ellipsoidal, ovoid, spheroidal or spherical outer shape, such that the propulsion system is protected from all sides in case of a collision with an external object. It is understood that the outer shape of the outer protective cage may be substantially flat at the bottom of the UAV to advantageously facilitate stable landing. In addition, the UAV may comprise an image capture device and thus the outer shape of the outer protective cage may be substantially flat in a region where the image capture device may project through the outer protective cage so that the view of the image capture device is advantageously unhindered over a wide angle of the environment around the UAV.

The UAV may further comprise an arm with a first end and a second end. Preferably, the arm has a longitudinal development along, for instance, a linear or a curved path. The first and second ends of the arm may be opposite each other along the longitudinal development of the arm.

The first end of the arm is attached or attachable to the outer protective cage. The arm may extend outward from the outer protective cage and, preferably, the second end of the arm is arranged at a distal end of the arm outside the outer protective cage, in such a manner that the second end of the arm is advantageously exposed to contact with the surface of the structure to be tested while the outer protective cage can advantageously be kept at a distance from the structure surface.

A structure-engaging surface configured to engage with the surface of the structure to be tested may be defined on the second end of the arm. The second end may comprise means for securing the structure-engaging surface to the structure surface. Such means include, for example, one or more magnets. Preferably, the magnets are arranged flush with the structure-engaging surface.

The UAV may further comprise an NDT sensor. As used herein, the term "NDT sensor" refers preferably to a sensor for performing non-destructive testing of structures. For example, the NDT sensor may be adapted for measuring a thickness or sensing a flaw of the structure to be tested. The NDT sensor may be configured to emit measurement signals and receive return signals in response thereto. The emitted measurement signals may be affected by the material of the structure being tested to provide return signals which are representative of the physical conditions of the structure.

The NDT sensor may comprise at least one ultrasonic sensor, such as a contact or a non-contact ultrasonic sensor. As used herein, the term "contact ultrasonic sensor" refers preferably to a sensor capable of performing ultrasonic testing ("UT") only by making direct or indirect contact between the sensor and the structure being tested. The term "non-contact ultrasonic sensor", instead, preferably refers to a sensor capable of performing UT without making such a contact. The non-contact ultrasonic sensor may be, for instance, an electromagnetic acoustic transducer. Additionally or alternatively, the NDT sensor may comprise an Eddy current sensor.

It is also contemplated that the NDT sensor may comprise an NDT scanner.

The NDT sensor may be mounted at the second end of the arm, at least when the NDT sensor is preferably in an operative configuration as explained further below. The NDT sensor may have a structure-engaging surface which is preferably flush with the structure-engaging surface of the second end, at least when the NDT sensor is in the operative configuration.

The arm may comprise a flexible section between the first end and the second end. The flexible section may extend along the longitudinal development of the arm. Advantageously, the flexible section allows movement of the second end relative to the first end according to at least two, preferably three and further preferably four, five or six degrees of freedom. The degrees of freedom freed up by the flexible section facilitate establishing a stable contact between the NDT sensor and the structure surface when the UAV approaches the structure surface from any of a wide range of angles relative to the horizontal or vertical plane. Additionally, the flexibility of the arm allows measurements to be taken also when the UAV makes slight adjustments to its position, such as compensating for crosswinds during hovering flight, without the NDT sensor losing contact with the stationary surface of the structure. It is understood that, in some embodiments, the flexible section is absent or replaced by a rigid section of the arm.

The flexible section may comprise a spring, such as a coil spring, or a resilient material, such as an elastomer. The spring or resilient material may be arranged along the longitudinal development of the arm thereby advantageously decoupling the second end thereof from the movements of the rest of the UAV.

In some embodiments, the flexible section may comprise one or more adjustable joints which are preferably arranged along the longitudinal development of the arm. Therefore, the arm may be articulated along its longitudinal development through the adjustable joints. The adjustable joints advantageously allow a user to adjust the orientation or arrangement of the arm relative to the rest of the UAV to best suit the orientation of the surface to be tested or to bypass any obstacles between the UAV and the surface to be tested, thereby facilitating measurements in hard-to-reach locations.

It should be noted that the adjustable joints may hold their position with appropriate holding force insomuch as the arm is not subject to an external force suitable to overcome such holding force. In particular, the holding force may be overcome by the external forces acting on the arm upon contact with the surface of the structure to be tested and during testing thereof, thereby allowing a sufficient amount of free movement of the UAV relative to the NDT sensor to allow adequate time for a reliable and repeatable reading to be taken by the NDT sensor.

It will be appreciated that thanks to the outer protective cage being advantageously fixed to the propulsion system, the arm with the NDT sensor may be oriented in the desired direction toward the surface of the structure to be tested by adjusting accordingly the yaw angle and possibly also the pitch and roll angles of the UAV via the propulsion system during flight or hovering of the UAV.

Therefore, this design advantageously eliminates any need for a cage actuation system configured to actively orient the outer protective cage with respect to the propulsion system.

It should be noted, however, that adjusting the pitch, roll or yaw angle of the UAV for precisely orienting the arm in the desired direction relative to the structure surface may pose significant challenges in flight control since such adjustments may have limited accuracy resulting in possible misplacement of the NDT sensor. This problem may be solved at least partially by minimizing the lever arm, that is the distance, between the NDT sensor and the UAV's centre of gravity which is typically at the origin of the UAV's roll, pitch and yaw axes.

In this respect, the presence of the outer protective cage allows reducing the distance between the NDT sensor and the UAV's centre of gravity since, by protecting the propulsion system, the outer protective cage allows the UAV to safely hover in the proximity of the surface of the structure to be tested thereby allowing the NDT sensor to be closer to the rest of the UAV.

The distance between the NDT sensor and the UAV's centre of gravity is further reduced by minimizing the arm's length. As used herein, the term "length" refers preferably to the length of the arm measured along the longitudinal development of the arm from the first end to the second end and, more precisely, from the first end to the structure-engaging surface of the second end. It is specified that, where the flexible section of the arm comprises a spring arranged along the longitudinal development of the arm, the arm's length may include the free length of the spring but preferably not the length of the spring wire.

The arm may be shorter than an overall linear dimension of the outer protective cage. For example, the arm may have a length not more than 70 or 50 percent and preferably not more than 40 or 30 percent of the overall linear dimension of the outer protective cage. In preferred embodiments, the arm's length does not exceed 25 or 20 percent of the overall linear dimension of the outer protective cage. As used herein, the term "overall linear dimension" refers preferably to the maximum outer linear dimension of the outer protective cage, i.e. the linear distance that separates the two points of the outer protective cage that are furthest from each other or, in other words, the diameter of the smallest sphere containing the outer protective cage. Where the outer protective cage has an at least partially spherical outer shape, the overall linear dimension is preferably the diameter, such as the equatorial diameter, of the at least partially spherical outer shape. Where the outer protective cage has an at least partially spheroidal or ellipsoidal outer shape, the overall linear dimension may be measured along the major axis (i.e., the longest of the principal axes) of the at least partially spheroidal or ellipsoidal outer shape. More particularly, where the outer protective cage has an at least partially spheroidal outer shape, the overall linear dimension may be the major diameter (i.e., the longest between the equatorial diameter and the polar diameter) of the at least partially spheroidal outer shape. However, it is preferred that the overall linear dimension be the equatorial diameter of the at least partially spheroidal outer shape. It is also preferred that the at least partially spheroidal outer shape be oblate.

Minimizing the arm's length is beneficial as long as the NDT sensor can establish and maintain stable contact with the surface of the structure to be tested. To establish and maintain such a contact, the arm's length is preferably greater than zero. In some embodiments, the arm's length is at least 1 or 2 percent and preferably at least 5 or 10 percent of the overall linear dimension of the outer protective cage. In this manner, the second end of the arm is advantageously exposed to contact with the surface of the structure to be tested while the outer protective cage can advantageously be kept at a distance from the structure surface. In addition, having a longer arm may increase the arm's flexibility, which in turn facilitates establishing and maintaining a stable contact with the surface of the structure to be tested.

To further improve the accuracy of measurements taken by the NDT sensor, it may be useful to perform such measurements on a cleaned surface. Therefore, in some embodiments, a cleaning tool for cleaning the surface of the structure to be tested is mounted to the arm and more particularly to the second end thereof, at least when the cleaning tool is preferably in an operative configuration as explained further below. The cleaning tool may comprise, for instance, a rotating cleaning tool.

It is understood that, more generally, the cleaning tool may be replaced by a manipulation tool adapted for manipulating the surface of the structure to be tested. The manipulation tool may comprise the cleaning tool and/or other tools such as a drilling tool or a sampling tool. Therefore, although preferred features will be described below in relation to embodiments in which the manipulation tool is a cleaning tool, such features may equally find application even in the case in which a generic manipulation tool is used.

Preferably, both the cleaning tool and the NDT sensor are mounted to the arm and more particularly to the second end thereof at least when they are in respective operative configurations. The cleaning tool can be deployed to clean a portion of the structure surface and then the NDT sensor can be positioned at the cleaned portion to perform a test, such as a thickness measurement. As the surface is cleaned prior to performing the test, more accurate results may be obtained.

In some embodiments, the arm comprises a tool-change mechanism configured to reversibly position selectively the manipulation tool or the NDT sensor in an operative configuration at the second end of the arm. More particularly, the tool-change mechanism is rotatable between a first position where the manipulation tool is in an operative configuration at the second end of the arm and the NDT sensor is in a rest configuration away from the second end, and a second position where the manipulation tool is in a rest configuration away from the second end of the arm and the NDT sensor is in an operative configuration at the second end. It should be noted that, in the operative configuration, a structure-engaging surface of the manipulation tool or NDT sensor, as applicable, is preferably flush or at least substantially parallel with the structure-engaging surface of the second end. In the rest configuration, instead, the structure-engaging surface of the manipulation tool or NDT sensor, as applicable, is preferably retracted and/or angled relative to the structure-engaging surface of the second end.

To switch between the first and the second position, the tool-change mechanism may comprise a first actuator with a first rotating shaft, whose axis of rotation may be inclined relative to the longitudinal development of the arm by an inclination angle which is preferably acute or right. The manipulation tool and the NDT sensor may be secured to the rotating shaft in respective angular positions thereof.

In some embodiments, the tool-change mechanism is configured to linearly displace the manipulation tool and the NDT sensor toward and away from the structure-engaging surface of the second end, preferably along the longitudinal development of the arm. More particularly, the tool-change mechanism in the first position and the second position is configured to linearly displace respectively the manipulation tool and the NDT sensor toward and away from the structure-engaging surface of the second end. In a preferred embodiment, when the manipulation tool is in the operative configuration, the tool-change mechanism is preferably configured to linearly displace the manipulation tool toward the structure surface before manipulating and away from the structure surface after manipulating. Similarly, when the NDT sensor is in the operative configuration, the tool-change mechanism is preferably configured to linearly displace the NDT sensor toward the structure surface before testing and away from the structure surface after testing. Advantageously, this configuration allows adapting the distance of the manipulation tool or the NDT sensor, as applicable, from the structure surface thereby avoiding friction with the structure surface when rotating the tool-change mechanism from the first position to the second position or vice-versa. Additionally, this configuration may turn useful for detaching the magnets from the structure surface by pushing the manipulation tool or the NDT sensor beyond the structure-engaging surface of the second end.

To allow the linear displacement of the manipulation tool and the NDT sensor, the first actuator may be mounted on a sliding element configured to be linearly displaced by a second actuator which may be fixed, for example, at the first end of the arm.

Where the manipulation tool associated with the tool-change mechanism comprises a cleaning tool, the tool-change mechanism advantageously allows positioning the NDT sensor at the cleaned portion of the structure surface directly after having operated the cleaning tool to clean said portion, avoiding the second end of the arm to move away from the cleaned portion in the meantime. As the second end holds its position against the structure surface while the tool-change mechanism switches the cleaning tool with the NDT sensor, the positioning of the NDT sensor in the cleaned portion is precise and thus an accurate measurement may be obtained.

To further improve the reliability of measurements taken by the NDT sensor, it may be useful to supply some couplant between the NDT sensor and the surface of the structure being tested. As used herein, the term "couplant" preferably refers to a fluid medium that facilitates sound transmission between the NDT sensor and the surface of the structure being tested.

Therefore, in some embodiments, the UAV comprises a couplant dispensing system for delivering a couplant onto the NDT sensor. Such provision is particularly advantageous to improve the reliability of flaw detection or thickness gauging with an ultrasonic NDT sensor.

The first end of the arm may be configured to reversibly attach to the outer protective cage. This configuration advantageously allows replacing the arm with a spare one, which may also have different features, and further allows removing the arm for maintenance or shipping of the UAV. In some embodiments, the first end is configured to reversibly attach to the outer protective cage in any one of a plurality of spaced-apart fastening portions of the outer protective cage. The fastening portions may be defined by respective beams or respective frame modules of the outer protective cage. Therefore, advantageously, the fastening portions are found nearly anywhere around the outer protective cage. It will be appreciated that such configuration advantageously allows attaching the arm to the outer protective cage in the location that best suits the orientation of the surface of the structure to be tested, resulting in a highly modular and versatile design.

In a preferred embodiment, the UAV comprises at least one mounting support fastened to the outer protective cage and advantageously configured to receive the first end of the arm. The first end of the arm may be attached or attachable to the at least one mounting support, preferably in a reversible manner. Additionally or alternatively, the at least one mounting support may be reversibly fastened to the outer protective cage.

Preferably, the arm is attached or attachable to the at least one mounting support in an articulated manner, for example about a pin interposed between the mounting support and the first end. Such articulation advantageously allows the arm to be oriented toward the surface of the structure to be tested, be it vertical, inclined or horizontal.

The UAV may comprise a plurality of mounting supports fastened to the outer protective cage. Preferably, the mounting supports are fastened to the outer protective cage in respective spaced-apart fastening portions of the outer protective cage. Further preferably, the arm is reversibly attached or attachable to a mounting support freely selected or selectable from the plurality of mounting supports. The possibility of attaching the arm to any one of the mounting supports advantageously allows attaching the arm in the position that best suits the spatial orientation of the structure surface.

The plurality of mounting supports may comprise at least two mounting supports fastened to the outer protective cage in respective fastening portions thereof which are vertically and/or horizontally spaced apart from each other.

The possibility of attaching the arm to vertically spaced apart portions of the outer protective cage facilitates non-destructive testing of both downward-facing surfaces, such as ceilings, and upward-facing surfaces, such as floors. To this aim, it is preferred that the fastening portions for the mounting supports are located respectively above and below the propulsion system.

Conversely, the possibility of attaching the arm to horizontally spaced apart portions of the outer protective cage facilitates non-destructive testing of a wall portion that is close to the intersection with another wall.

Indeed, where the arm is attached to a front portion of the outer protective cage, the intersection between two walls may prevent the arm from reaching the wall portion to be tested. This problem may be solved, at least partially, by attaching the arm to a side portion of the outer protective cage, wherein said side portion is horizontally spaced apart from the front portion of the outer protective cage.

For instance, the mounting supports may be fastened to the outer protective cage in respective fastening portions thereof which are horizontally spaced apart from each other along parallels, i.e. circles of latitude, defined on the outer protective cage.

It is understood that, in some embodiments, the plurality of mounting supports comprises three or more mounting supports that may be vertically and/or horizontally spaced apart from each other.

In a further aspect, the invention relates to a method for performing NDT of structures comprising:

providing a UAV according to one or more of the features mentioned above, determining a spatial orientation of a surface of a structure to be tested, selecting a mounting support from the plurality of mounting supports based on the spatial orientation of the structure surface, reversibly attaching the arm to the selected mounting support, flying the UAV adjacent to the structure surface, approaching the NDT sensor to the structure surface, and operating the NDT sensor.

BRIEF DESCRIPTION OF THE DRAWINGS

The features and advantages of the invention will be made clear by the following detailed description of a preferred, but not exclusive, exemplary embodiment thereof, illustrated by way of non-limiting example with reference to the appended drawings in which.

PREFERRED EMBODIMENT OF THE INVENTION

Referring to the figures, a UAV 1 for performing non-destructive testing ("NDT") of structures according to embodiments of the invention comprises an outer protective cage 2, a propulsion system 3 mounted inside the outer protective cage 2, an arm 4 with a first end 5 attached to the outer protective cage 2, and an NDT sensor 6 mounted at a second end 7 of the arm, the arm 4 preferably comprising a flexible section 8 between the first end 5 and the second end 7.

The propulsion system 3 may comprise a body 9 and a number of rotors 10 supported by the body 9. The rotors may comprise one or more propellers driven by electric motors controlled by a control system and powered by one or more batteries, according to various configurations that are per se known in the art. Within the scope of the invention, the propulsion system may however be driven by other types of motors, for instance combustion motors and the energy source provided in the form for instance of liquid fuel. In preferred embodiments, the propulsion system may comprise three or four propellers, for instance in a rectangular configuration, the propellers being individually controlled, or controlled in pairs, to adjust the roll, yaw, and pitch angles of the UAV 1 for flight and hovering of the UAV.

Figure 16:
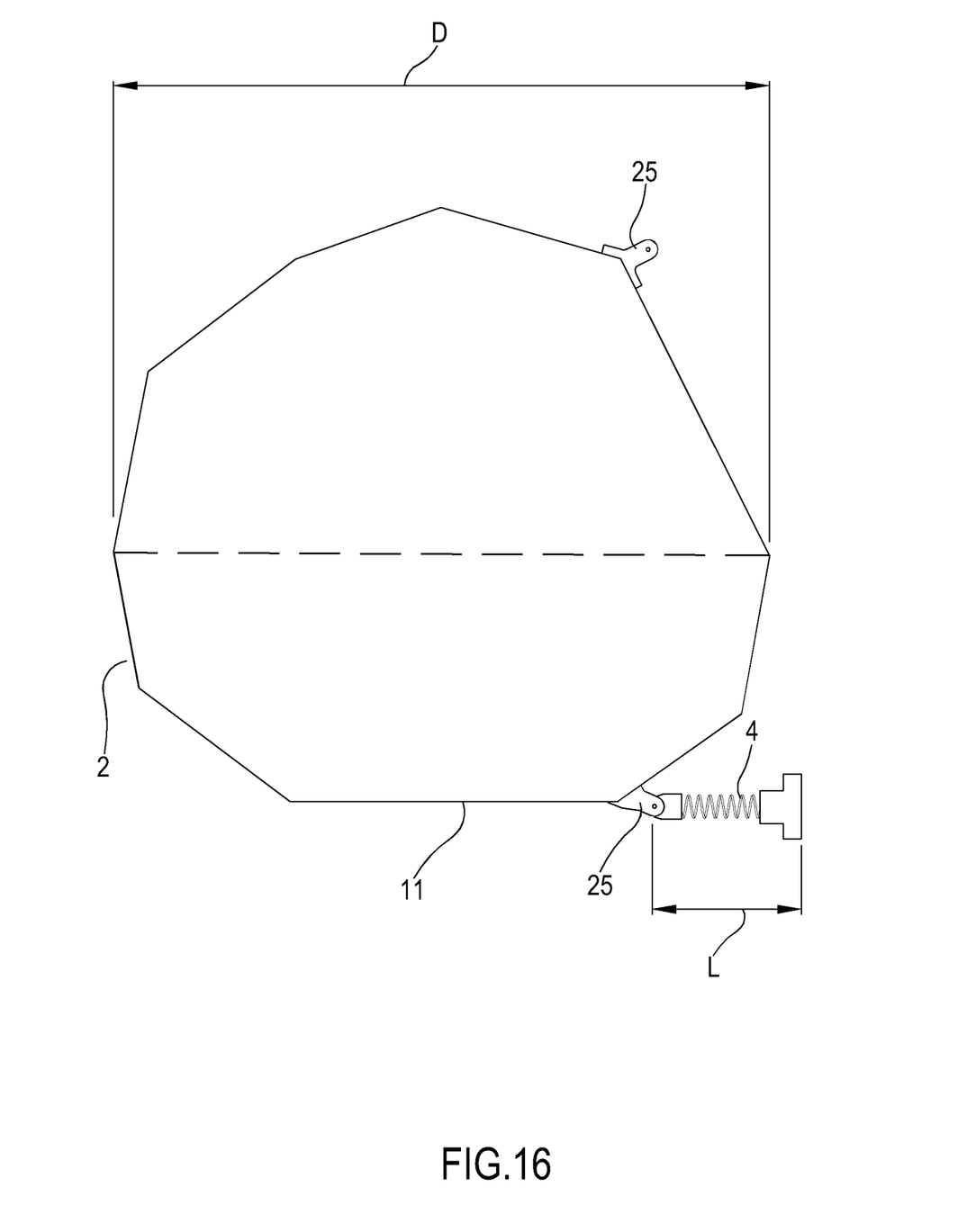
FIG. 16 is a schematic representation of the UAV according to a further embodiment of the invention.

The outer protective cage 2 may be fixed to the body 9 of the propulsion system and may have a substantially spherical shape, as shown in the examples of FIGS. 1-5, optionally with a flat bottom 11. Alternatively, the outer protective cage 2 may have a substantially spheroidal shape, as shown in the example of FIG. 16, optionally with the flat bottom 11. The outer protective cage 2 may comprise beams 12 connected together to form frame modules 13. The frame modules 13 may have an outer pentagon shape and may be reversibly fixed together. More particularly, adjacent frame modules 13 may be reversibly fixed together at the corners 13a of their outer pentagon shape, for example by connectors 14.

The connectors 14 may be permanently attached to the longitudinal extremities of the beams 12, or in a preferred embodiment, the connectors 14 may be configured to allow removable connection between frame modules 13 such that the outer protective cage 2 can be assembled from frame modules 13 and disassembled at least partially. The assembly and disassembly of the frame modules 13 advantageously facilitate the shipping of the UAV 1 by providing the outer protective cage 2 in parts that may be connected together prior to use, and disconnected in two or more parts for packaging, storage and transport. The disassembly of frame modules 13 may also facilitate maintenance, for example by replacing frame modules with broken beams, or access to the propulsion system 3 inside the outer protective cage 2.

In some embodiments, a sensor support system 15 is fixed on the outer protective cage 2 and a sensor system 16 may be coupled to the sensor support system 15. The sensor support system 15 may comprise a cage frame member 17 that, in preferred embodiments, comprises an outer profile similar to a frame module 13 such that the sensor support system 15 may be fixed to the outer protective cage 2 forming part of the outer protective cage 2 in replacement of one of the frame modules 13. More particularly, the cage frame member 17 may comprise beams 12 which are preferably arranged in a pentagon shape.

The sensor system 16 may comprise an image capture device 18, for instance in particular a video camera for capturing moving or still images, and may further comprise a lighting system 19, for instance for projecting infrared or visible light for the image capture device 18.

The cage frame member 17 may be fixed to the outer protective cage 2 and configured to provide an opening 20 allowing the sensor system 16 to project therethrough, so that the image capture device 18 has an unhindered view over a wide angle of the environment around the UAV 1.

The NDT sensor 6 is supported by the arm 4, which may be attached to the outer protective cage 2 and extend outward therefrom. Referring to the embodiments of FIG. 1, 2 or 4, the arm 4 may extend in front of the sensor system 16 to advantageously protect the sensor system 16 from impacts with external objects and especially from impacts with a surface 21 of a structure to be tested by the NDT sensor 6.

The NDT sensor 6 may comprise an ultrasonic sensor 22 adapted for measuring the thickness or identifying a flaw of the structure.

The arm 4 extends along a longitudinal development X between the first end 5 of the arm, which is attached or attachable to the outer protective cage 2, and the second end 7 of the arm, on which a structure-engaging surface 23 can be identified. The longitudinal development X of the arm between the first end 5 and the second end 7 may be straight or curved. The structure-engaging surface 23 may be planar and preferably perpendicular to the longitudinal development X of the arm 4. The NDT sensor 6 may be secured to the second end 7 and may have a structure-engaging surface 24 which is planar and preferably flush with the structure-engaging surface 23 of the second end 7.

Figure 6:
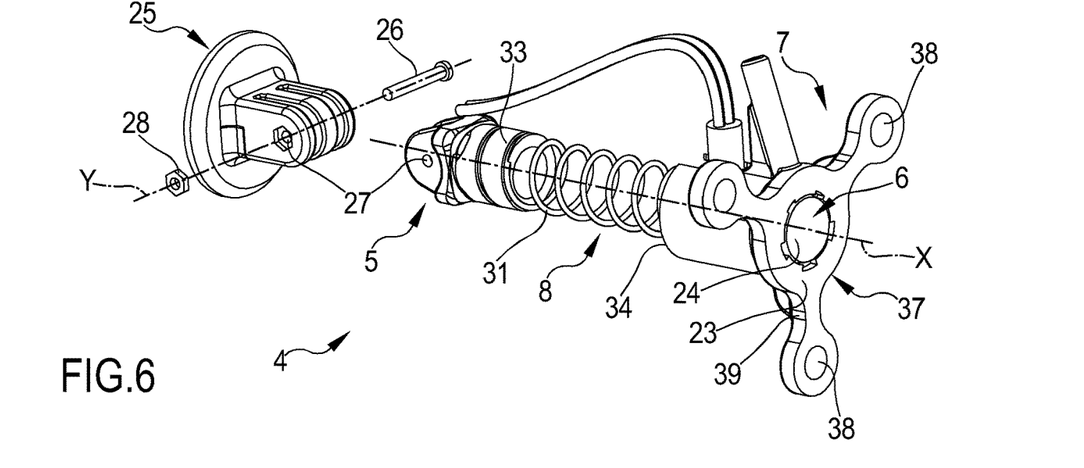
FIG. 6 is a perspective view of the arm of the UAV of the preceding figures together with an exemplary embodiment of a mounting support of the arm.

The first end 5 may be attached to the outer protective cage 2 through a mounting support 25. It is preferable that the first end 5 is attached or attachable to the mounting support 25 in an articulated manner, for example about a pin 26 illustrated in the embodiment of FIG. 6. The pin 26 may be inserted into openings 27, such as through holes, defined respectively in the first end 5 and the mounting support 25.

The articulation between the first end 5 and the mounting support 25 allows the arm 4 to be rotated upward or downward about an articulation axis Y which may be arranged parallel to the pitch axis of the UAV. It will be appreciated that the articulation advantageously allows directing the arm 4 perpendicularly to the surface 21 of the structure to be tested, in such a manner that the structure-engaging surface 24 of the NDT sensor 6 may be parallel with the structure surface 21.

Figure 2:
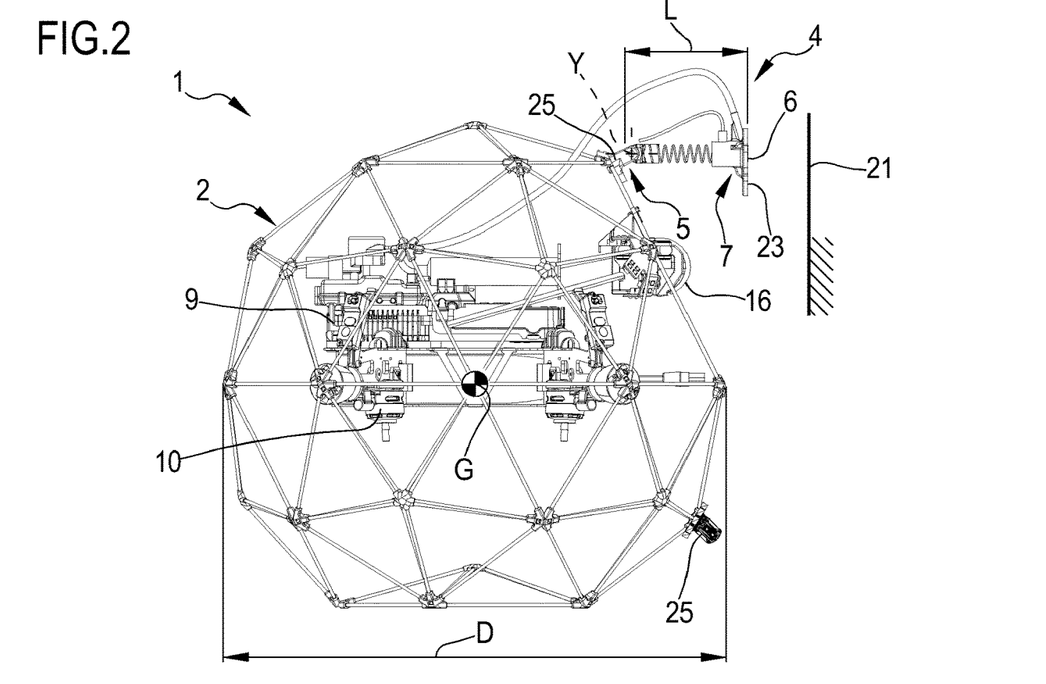
FIG. 2 is a side view of the UAV of FIG. 1.
Figure 3:
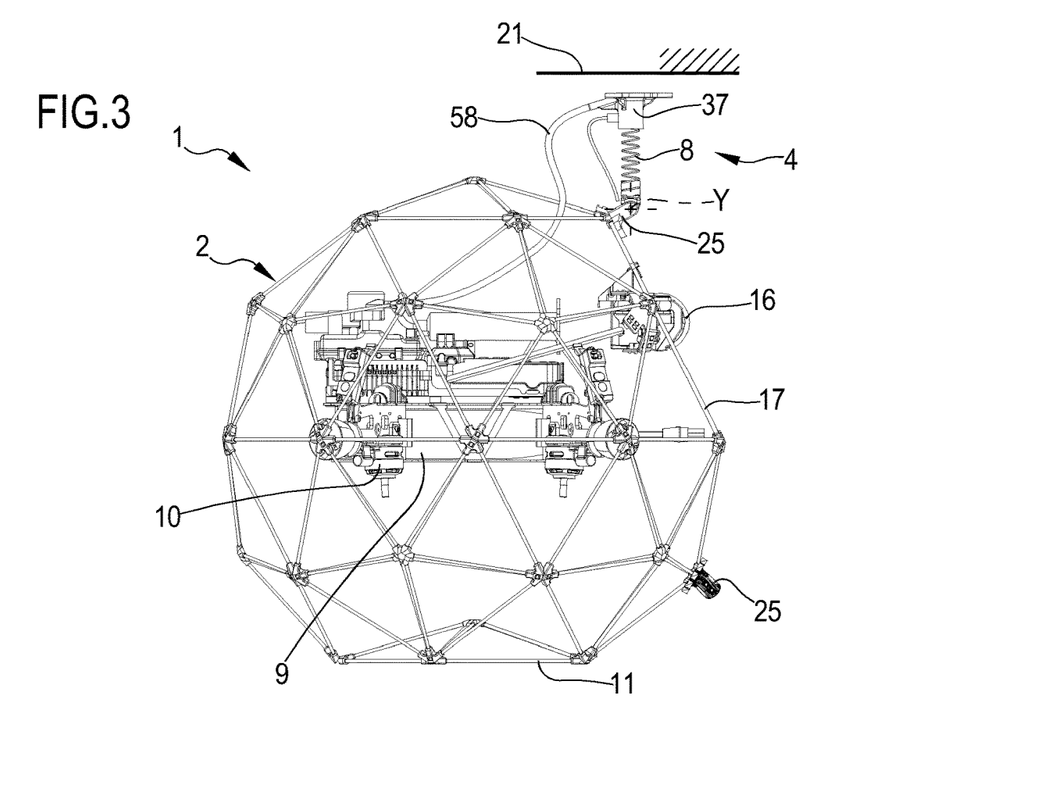
FIG. 3 is a side view of the UAV of FIG. 1 with the arm rotated upward.

FIGS. 2 and 3 show two exemplary orientations that the arm 4 may take about the articulation axis Y to direct the NDT sensor 6 toward the structure surface 21. In the example of FIG. 2, the arm 4 is oriented horizontally to deploy the NDT sensor 6 on a vertical surface located in front of the UAV 1. In the example of FIG. 3, instead, the arm 4 is rotated upward to deploy the NDT sensor 6 on a horizontal surface located above the UAV. It will be appreciated that providing an arm 4 that is capable of being moved to a wide range of angles relative to the horizontal plane avoids the UAV having to adopt an erratic and dangerous flight path and facilitates good contact between the NDT sensor 6 and the structure surface 21.

The mounting support 25 and the first end 5 may be configured to allow mutual removable attachment such that the arm 4 can be attached to and removed from the outer protective cage 2 at least partially. Reversible attachment means, preferably with quick release, may be provided between the first end 5 and the mounting support 25. For example, the pin 26 may be reversibly inserted into the openings 27 and held in place by a threaded connection, for example with a nut 28. It is understood that the pin 26 and the nut 28 may be replaced by other attachment means, such as a bayonet fitting between the first end 5 and the mounting support 25.

The attachment and removal of the arm 4 may facilitate the shipping of the UAV 1 by providing it in parts that may be connected together prior to use, and disconnected in two or more parts for packaging, storage and transport. The removal of the arm 4 may also be used for maintenance, for example when the arm 4 is broken, or for replacing the arm 4 with another one having different features such as a different length L or a different NDT sensor 6.

In some embodiments, the removal and reattachment of the arm 4 allow changing the location of the arm 4 on the outer protective cage 2. For example, the arm 4 may be reversibly attachable in any one of a number of locations of the outer protective cage 2 which are vertically spaced apart from each other. To this end, the UAV 1 may comprise a plurality of mounting supports 25 fastened to the outer protective cage 2 in respective spaced-apart fastening portions of the outer protective cage 2. The fastening portions may be defined by the beams 12 of respective frame modules 13 and/or of the cage frame member 17. The arm 4 can be reversibly attached to any mounting support 25 selected from the plurality of mounting supports 25.

The embodiments of FIGS. 1-3, 4 and 5 show a range of three positions in which the arm 4 may be placed on the outer protective cage 2.

Figure 1:
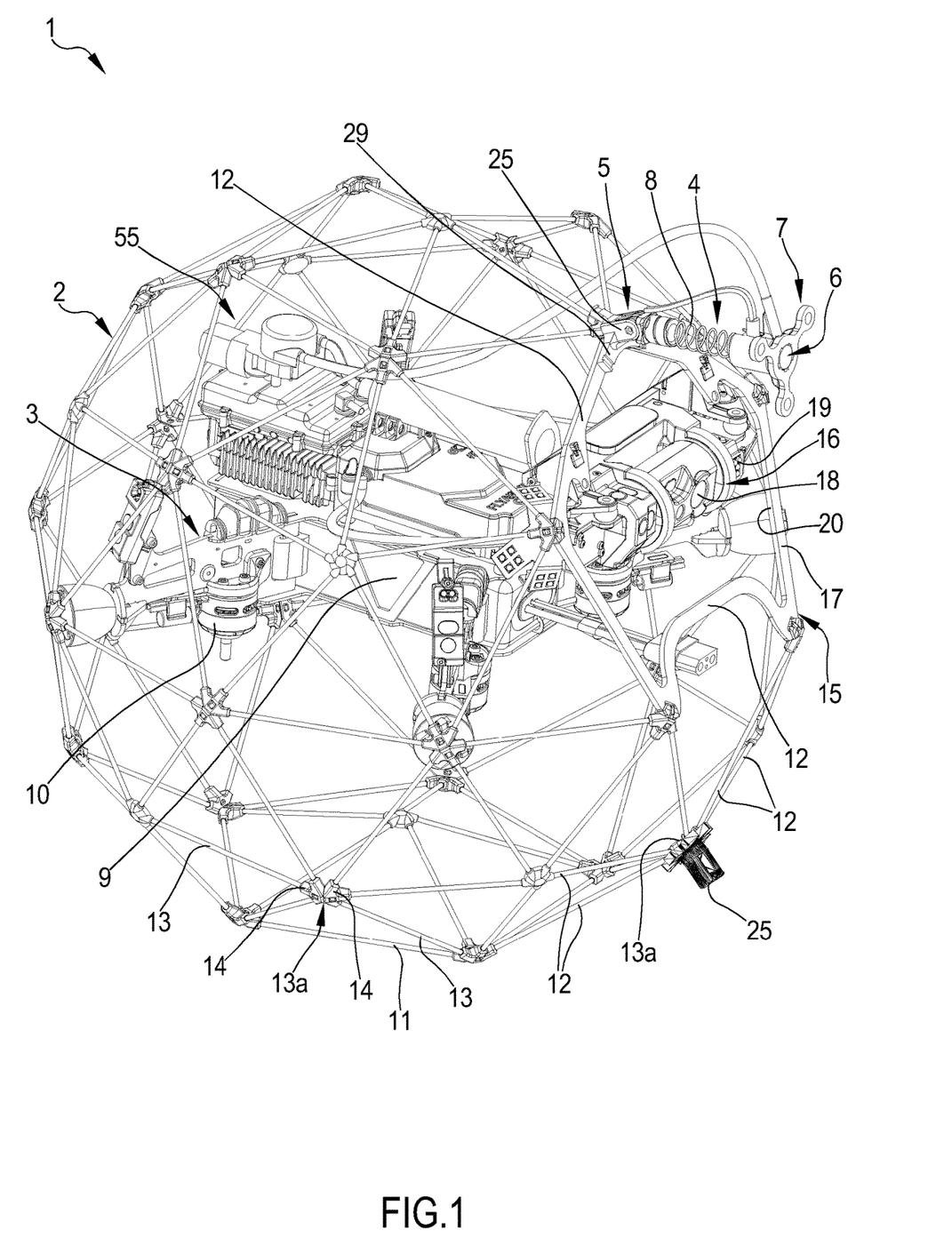
FIG. 1 is a front elevation perspective view of a UAV according to an embodiment of the invention.

Referring to the example of FIGS. 1-3, the arm 4 may be mounted in a region of the outer protective cage 2 which is located above the body 9, rotors 10 and/or sensor system 16. This configuration may be suitable for testing a wall located in front of the UAV 1 when the arm 4 also extends in front of the UAV as shown in FIGS. 1 and 2, or a downward-facing surface located above the UAV when the arm 4 is rotated upward as shown in FIG. 3.

Figure 4:
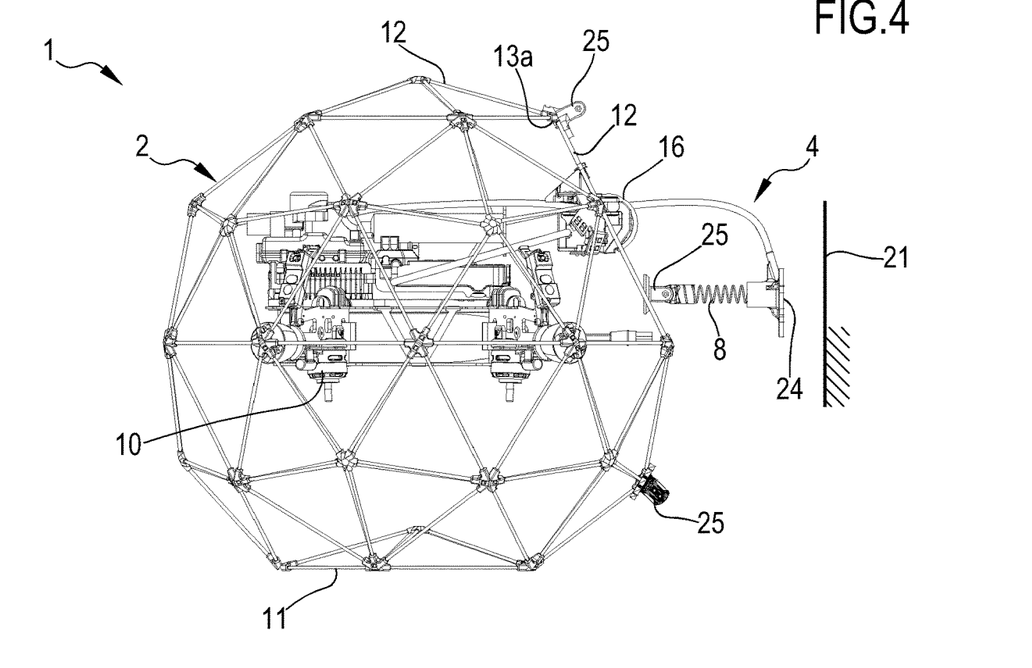
FIG. 4 is a side view of the UAV of FIG. 1 with the arm in a front position.

Referring to the example of FIG. 4, the arm 4 may be mounted at a height between the rotors 10 and the sensor system 16. This configuration may be suitable for testing a wall in front of the UAV 1.

Figure 5:
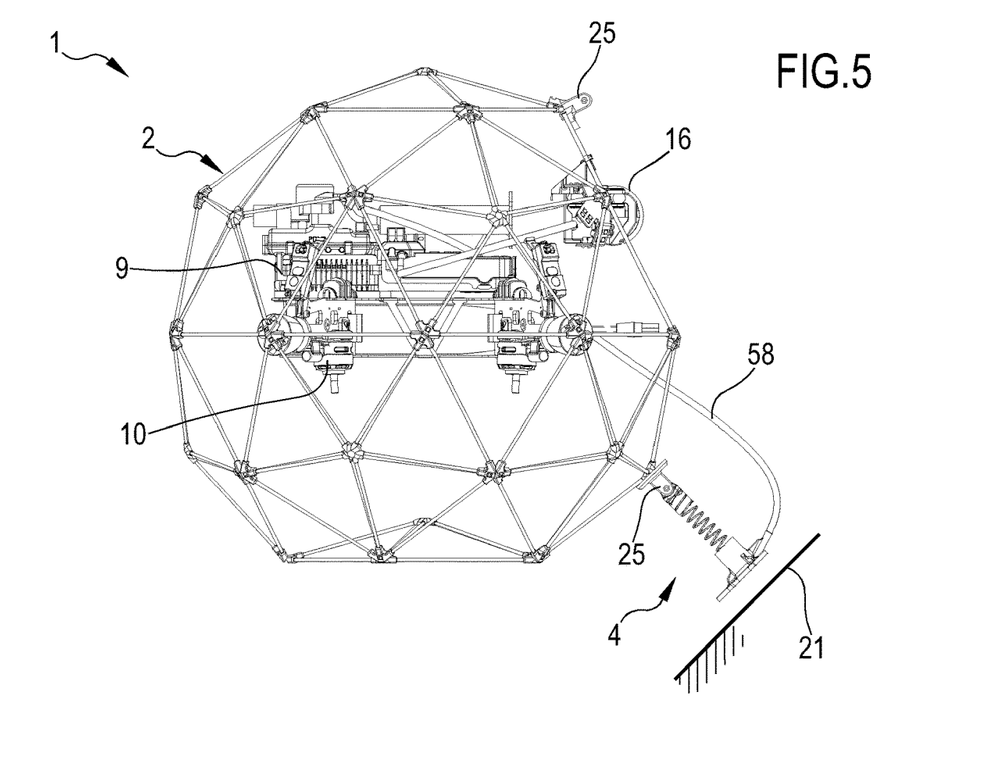
FIG. 5 is a side view of the UAV of FIG. 1 with the arm in a lower position.

Referring to the example of FIG. 5, the arm 4 may be mounted in a region of the outer protective cage 2 which is located below the body 9 and/or rotors 10. This configuration may be suitable for testing an upward-facing surface located below the UAV 1, be it a horizontal or inclined surface.

Figure 7:
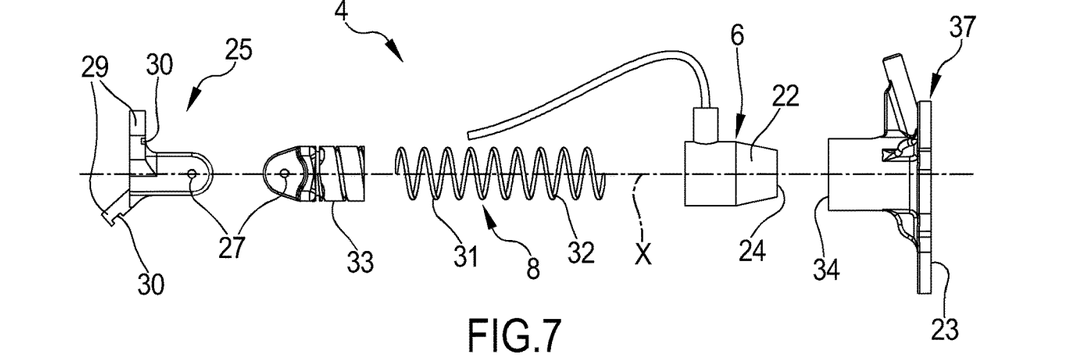
FIG. 7 is a side exploded view of the arm of FIG. 6 together with a further exemplary embodiment of the mounting support thereof.

In some embodiments, the mounting supports 25 are reversibly fastened to the outer protective cage 2, preferably at the interconnected corners 13a of adjacent frame modules 13 and possibly of the cage frame member 17, for example through zip ties. More precisely, the zip ties may fasten the mounting supports 25 to the beams 12 of the outer protective cage. Referring to the example of FIG. 7, each mounting support 25 may include one or more legs 29 configured to adhere to respective beams 12 of the frame modules 13 and/or of the cage frame member 17. The legs 29 may extend along the beams 12 to which they adhere and may be fastened thereto through respective zip ties. More particularly, the zip ties may be passed through respective grooves 30 of the legs 29. Preferably, the grooves 30 are extended perpendicularly to the respective legs 29.

By removing a mounting support 25 from the outer protective cage 2 it is possible to refasten it to a different fastening portion of the outer protective cage 2. More particularly, a plurality of spaced-apart fastening portions may be defined on the outer protective cage 2, and one or more mounting supports 25 may be reversibly fastened to the outer protective cage 2 in respective spaced-apart fastening portions thereof selected or selectable from the plurality of spaced-apart fastening portions. For example, referring to FIG. 1, two mounting supports 25 are fastened to the outer protective cage 2 in respective fastening portions thereof which are vertically spaced apart from each other. Moreover, referring to the example of FIG. 4, a third mounting support 25 may be fastened to the outer protective cage 2, more precisely to the frame cage member 17, in a position that is advantageously interposed between the other two mounting supports.

It will be appreciated that providing an arm 4 that is capable of being mounted in a wide range of locations on the outer protective cage 2 allows mounting the arm 4 in the location that best suits the orientation of the surface 21 of the structure to be tested. Moreover, it should be noted that the possibility of mounting the arm 4 in a wide range of locations on the outer protective cage 2 may be combined with the possibility of rotating the arm 4 about the pin 26, to advantageously ensure that the NDT sensor 6 can always be arranged essentially parallel with the structure surface 21, be it vertical, inclined, horizontal, upward-facing or downward-facing.

To facilitate good contact between the structure surface 21 and the NDT sensor 6, the arm 4 may comprise the flexible section 8 extending between the first end 5 and the second end 7. Referring to the examples of FIGS. 6 to 8, the flexible section 8 comprises a spring 31, preferably a coil spring 32, extending along the longitudinal development X of the arm. At the first end 5, a longitudinal extremity of the spring 31 is preferably fitted onto a mounting piece 33 configured to reversibly attach to any one of the mounting supports 25. At the second end 7, instead, the opposite longitudinal extremity of the spring 31 is preferably housed in a cap 34. Advantageously, between the mounting piece 33 and the cap 34, the spring 31 is free to stretch, bend or twist in space, in such a manner that the NDT sensor 6 may move in degrees of freedom in translation and/or rotation relative to the outer protective cage 2. The degrees of freedom may facilitate the NDT sensor 6 sitting flush against the structure to be inspected which ensures accurate readings and allows enough free movement of the UAV 1 to allow adequate time for a reliable and repeatable reading to be taken by the NDT sensor.

Figure 9:
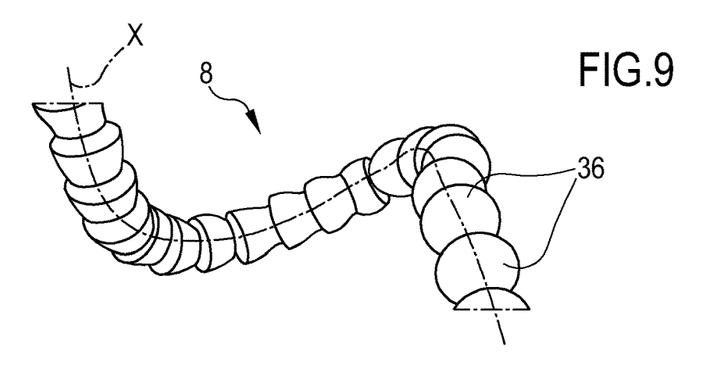
FIG. 9 is a perspective view of a section of the arm of the UAV according to an embodiment of the invention.

It is understood that, in alternative or addition to the spring 31, the flexible section 8 may comprise an elastomer 35, such as a polymeric elastomer or rubber material, as explained further below referring the example of FIGS. 12-14, and/or one or more adjustable joints 36 connected in series along the longitudinal development X of the arm as illustrated, for example, in FIG. 9.

The adjustable joints 36, such as ball joints or flexible joints, may be made from a chain of plastic fittings that are fitted together and which, with suitable holding force, maintain their bend in a clamping manner. In some embodiments, the adjustable joints 36 form a gooseneck such as those found in gooseneck lamps or microphone stands. The gooseneck may be made from a coiled metal hose which can be bent in the desired direction and remain in that position.

Figure 8:
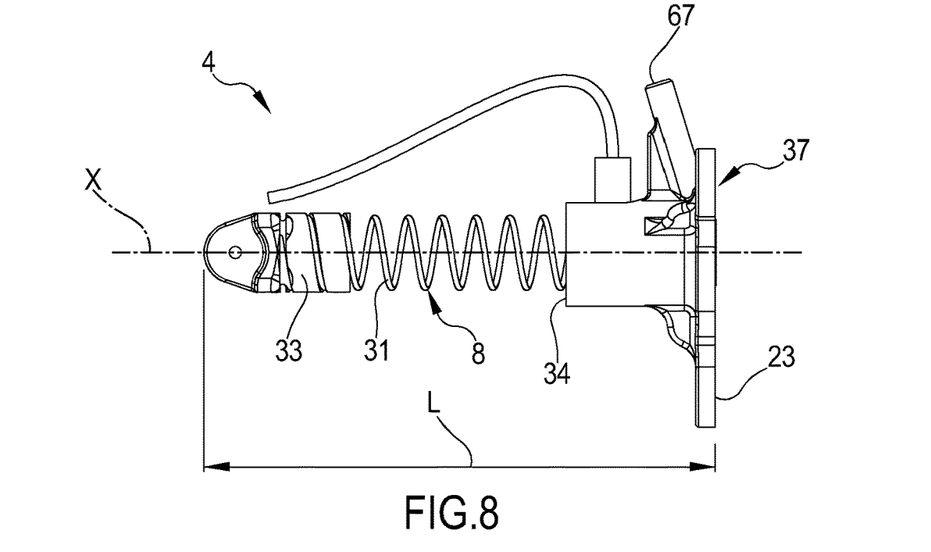
FIG. 8 is a side view of the assembled arm of FIG. 7.

Referring to the examples of FIGS. 2 and 8, the arm 4 is dimensioned to extend longitudinally for a length L which is between 1 and 50 percent, preferably between 1 and 30 percent and further preferably between 5 and 25 percent of an overall linear dimension D (in the present embodiment, the equatorial diameter) of the outer protective cage 2. Such length L allows optimal placement of the NDT sensor 6 relative to the rest of the UAV since, on one hand, it ensures that the distance between the NDT sensor and the outer protective cage 2 is sufficiently large for providing a sufficient degree of freedom between the NDT sensor and the outer protective cage and, on the other hand, it ensures that the distance between the NDT sensor and the UAV's centre of gravity G is sufficiently small for precisely controlling the position of the NDT sensor by adjusting the yaw angle and possibly also the pitch and roll angles of the UAV during flight or hovering.

In some embodiments, the NDT sensor 6 may be secured to a sensor mount 37 attached to the second end 7. The sensor mount 37 may be integral to the cap 34. The structure-engaging surface 23 of the second end 7 may be identified on the side of the sensor mount 37 opposite the first end 5 along the longitudinal development X of the arm. The NDT sensor 6 may be positioned in the sensor mount 37 such that the structure-engaging surface 24 of the NDT sensor is substantially flush with the structure-engaging surface 23 of the second end. This design is advantageous during measurement when, in some embodiments, the NDT sensor 6 must be placed in a position directly abutting or immediately adjacent to the surface 21 of the structure under test.

Further to this point, it should be noted that the flexible section 8 advantageously allows for independent movement of the UAV 1 relative to the NDT sensor 6 such that minor variations in the flight of the UAV do not interfere with the flush contact that the NDT sensor may require to obtain accurate measurements. It is understood, however, that in some embodiments the NDT sensor 6 may be suitable for performing measurements at some distance from the structure surface 21. In this case, the NDT sensor 6 may be mounted in a retracted position relative to the structure-engaging surface 23 of the second end.

A plurality of magnets 38 may be secured to the sensor mount 37 for reversibly attaching the sensor mount 37 to the structure surface 21, especially in the preferred case of a metallic structure. To ensure good contact for an NDT measurement to be made, the magnets 38 are preferably arranged flush with the structure-engaging surface 24 of the NDT sensor. Moreover, in some embodiments, the structure-engaging surface 23 of the second end is defined by the magnets 38, which are preferably three so as to advantageously allow isostatic contact with the structure surface 21.

The magnets 38 may be permanent magnets and, more particularly, neodymium magnets since such magnets are smaller and stronger.

The magnets 38 may be mounted on respective branches 39 of the sensor mount 37. The branches 39 may lie on a plane perpendicular to the longitudinal development X of the arm and may project radially around the NDT sensor 6. It is preferable that the branches 39 are spaced from each other by a constant angle A1. Referring to the example of FIG. 10, the sensor mount 37 has three branches 39 spaced 120 degrees from each other.

Advantageously, the branches 39 are flexible so as to adapt to the shape of the structure surface 21, be it convex, flat or possibly concave. As an example, if a pipe is to be inspected, then the flexible branches 39 will flex so as to adapt to the curvature of the pipe. However, if a flat metal wall is to be tested, the flexible branches 39 will remain straight.

The magnets 38 may be detached from the structure surface 21 by pushing the UAV 1 away from the structure surface via the propulsion system 3. In some cases, the propulsion system 3 may also lean and rotate the outer protective cage 2 against the structure surface 2 to pull the magnets 38 away therefrom.

Figure 12:
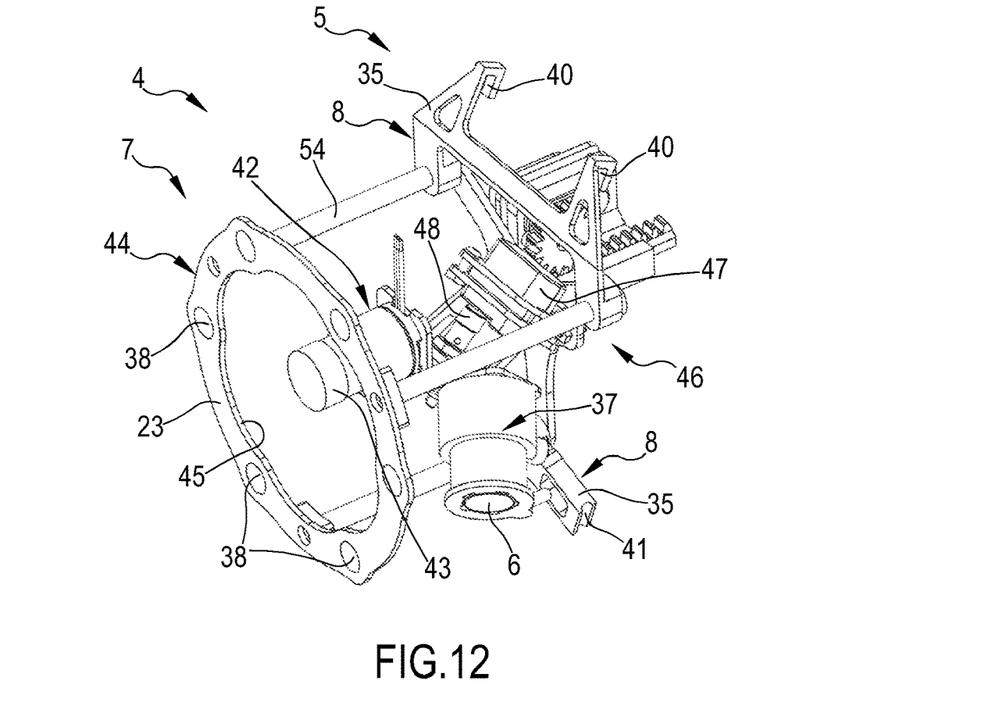
FIG. 12 is a front elevation perspective view of the arm of the UAV according to a further embodiment of the invention.
Figure 13:
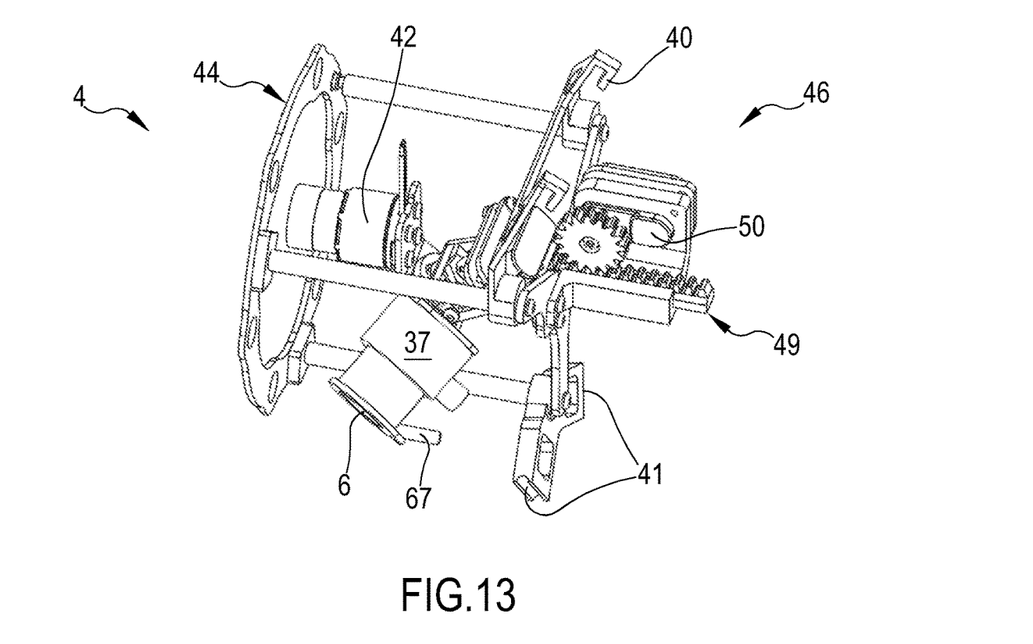
FIG. 13 is a rear elevation perspective view of the arm of FIG. 12.
Figure 14:
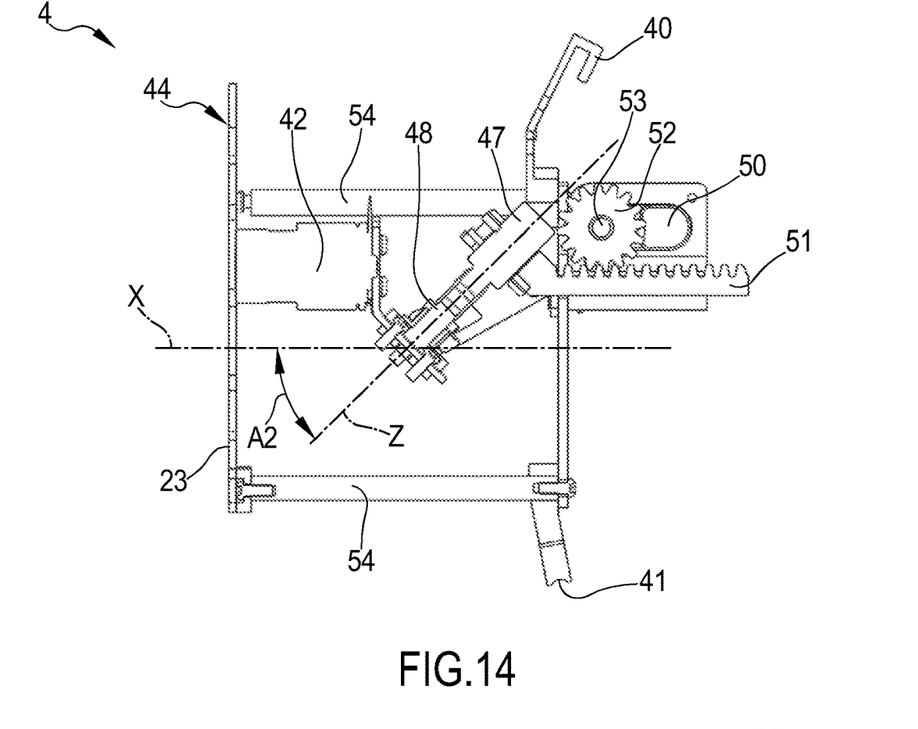
FIG. 14 is a side cross-sectional view of the arm of FIG. 12.

Referring to a further embodiment of the arm 4 shown in FIGS. 12 to 14, the first end 5 is configured to reversibly attach to the outer protective cage 2. More particularly, the arm 4 may comprise securing means adapted for securing the first end 5 to one or more beams 12 of the outer protective cage 2. For example, the arm 4 may comprise one or more hooks 40 positioned at the first end 5 and configured to hang from a beam 12. The arm may further comprise a pair of opposing grooves 41 positioned at the first end 5, the opposing grooves 41 configured to wedge between respective adjacent beams 12. The hooks 40 and the grooves 41 may be vertically spaced apart from each other. More particularly, the hooks 40 may be located above the grooves 41. This design advantageously allows the arm 4 to be removed from and reversibly attached to the outer protective cage 2 in any one of a plurality of spaced-apart fastening portions thereof.

The hooks 40 and the grooves 41 or other securing means may be made from an elastomer 35 which may further extend from the first end 5 toward the second end 7 to form the flexible section 8 of the arm.

In some embodiments, the arm 4 comprises a cleaning tool 42 that may be mounted at the second end 7, at least when the cleaning tool is in an operative configuration as explained further below. The cleaning tool 42 may comprise a rotating brush, for instance a steel or abrasive brush. Optionally, the cleaning tool 42 comprises a cleaning pad 43, such as an abrasive cleaning pad, which is removably attached to the cleaning tool 42 thereby allowing the replacement of the cleaning pad. The cleaning pad 43 may be attached to the cleaning tool 42 with a fastening system of the type known with the VELCRO trademark.

The arm 4 may comprise a structure-engaging element 44 mounted at the second end 7. The structure-engaging surface 23 of the second end may be defined on the side of the structure-engaging element 44 opposite the first end 5 along the longitudinal development X of the arm. A plurality of magnets 38 may be secured to the structure-engaging element 44 for reversibly attaching it to the surface of the structure to be tested. Preferably, the structure-engaging surface 23 is substantially planar and, further preferably, the magnets 38 are substantially flush with the structure-engaging surface 23. In some embodiments, an opening 45 is defined through the structure-engaging element 44. The magnets 38 may be arranged around the opening 45. Advantageously, the opening 45 allows the NDT sensor 6 and/or the cleaning tool 42 to project therethrough.

In some embodiments, the cleaning tool 42 and the sensor mount 37 are associated with a tool-change mechanism 46 integrated into the arm 4. Advantageously, the tool-change mechanism 46 is configured to alternatively position the cleaning tool 42 or the sensor mount 37 in an operative configuration at the second end 7. In a preferred embodiment, the tool-change mechanism 46 comprises a first actuator 47, such as a first electric motor, with a first rotating shaft 48, whose axis of rotation Z is preferably inclined relative to the longitudinal development X of the arm by an inclination angle A2 preferably between 30° and 60° and further preferably about 45°. The cleaning tool 42 and the sensor mount 37 may be secured to the first rotating shaft 48 in respective angular positions thereof in such a manner that the first rotating shaft 48 is rotatable between a first position where the cleaning tool 42 is in an operative configuration at the second end 7 and the NDT sensor 6 is in a rest configuration away from the second end as illustrated in the example of FIGS. 12 to 14, and a second position where the cleaning tool 42 is in a rest configuration away from the second end 7 and the NDT sensor 6 is in an operative configuration at the second end.

In some embodiments, the tool-change mechanism 46 is further configured to linearly displace the cleaning tool 42 and the sensor mount 37 along the longitudinal development X of the arm. More particularly, the first actuator 47 may be mounted on a sliding element 49 configured to be linearly displaced along the longitudinal development X of the arm by a second actuator 50, such as a second electric motor, fixed for instance at the first end 5. The sliding element 49 may be in the form of a rack 51 configured to engage with a cog 52 fitted to a second rotating shaft 53 of the second actuator 50. The rack 51 may extend along the longitudinal development X of the arm, whereas the second rotating shaft 53 may extend perpendicularly thereto.

The structure-engaging element 44 and the securing means for securing the first end 5 to the outer protective cage 2 may be connected to each other by one or more connection elements 54 extending along the longitudinal development X of the arm. In a preferred embodiment, the connection element(s) 54 and the structure-engaging element 44 define a protected chamber within which the tool-change mechanism 46 with the cleaning tool 42 and the sensor mount 37 are housed and protected from accidental impacts with the environment.

Figure 15:
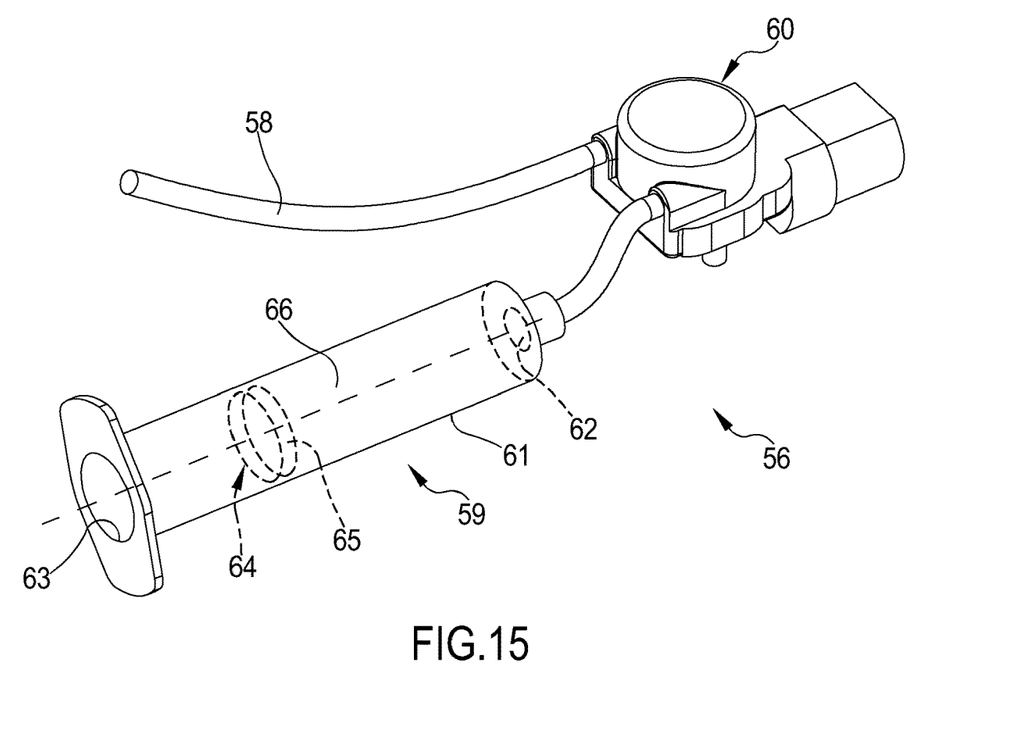
FIG. 15 is a perspective view of a detail of the UAV of FIG. 1.

As shown at least partially in the example of FIG. 15, the UAV 1 may further comprise a couplant dispensing system 55 for delivering a couplant onto the NDT sensor 6. The presence of such a system 55 is particularly advantageous where the NDT sensor comprises a contact ultrasonic sensor.

Figures 10, 11:
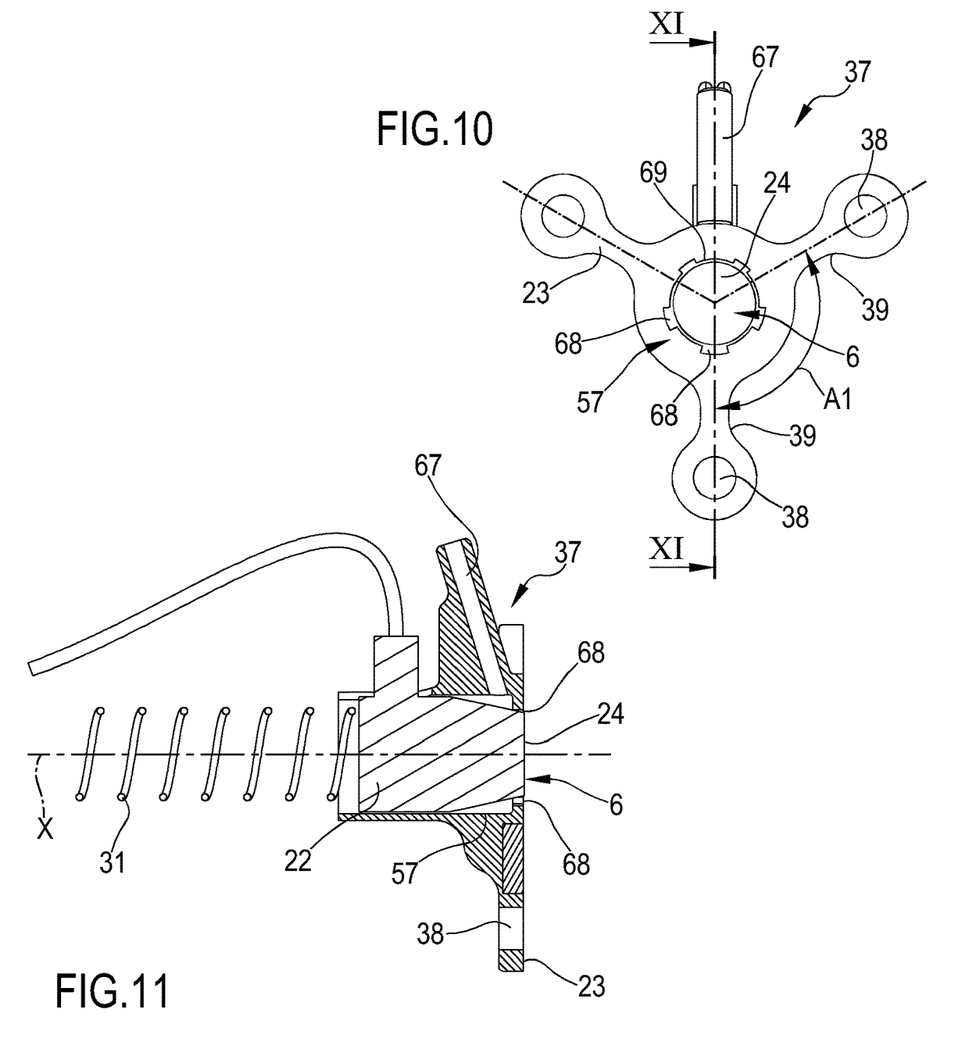
FIG. 10 is a front view of the arm of FIG. 8.
FIG. 11 is a partial cross-sectional view along line XI-XI of the arm of FIG. 10.

The couplant dispensing system 55 may comprise a couplant dispensing device 56 mounted inside the outer protective cage 2, a couplant dispensing nozzle 57 arranged preferably at the second end 7 as illustrated in FIGS. 10 and 11, and a tubing system 58 for fluidly connecting the couplant dispensing device 56 and nozzle 57.

The tubing system 58 may be flexible to advantageously allow moving the arm 4 to a wide range of angles and locations around the outer protective cage 4.

The couplant dispensing device 56 may include a couplant reservoir 59 and a pump 60 fluidly connected thereto for delivering the couplant from the couplant reservoir 59 to the couplant dispensing nozzle 57.

The pump 60 may be of the peristaltic type thereby providing high dosing accuracy. It is understood that other types of pumps may be used.

Preferably, the couplant reservoir 59 comprises a cylindrical container 61. The cylindrical container 61 may have a first opening 62 that is fluidly connected to a suction side of the pump 60, and a second opening 63 that is in fluidic communication with the external environment and thus subject to atmospheric pressure. The cylindrical container 61 may extend longitudinally from the first opening 62 to the second opening 63.

The couplant reservoir 59 may further comprise a piston 64 that fits tightly within the cylindrical container 61. Preferably, the piston 64 includes a seal 65, such as a rubber seal, adapted for providing watertight and airtight fitting between the piston 64 and the cylindrical container 61. The piston 64 may be arranged along the inside of the cylindrical container 61 between the first and second openings 62, 63 thereby defining a watertight and airtight chamber 66 that is fluidly connected to the pump 60 via the first opening 62. Such chamber 66 is adapted for containing the couplant.

It will be appreciated that the cylindrical container 61 and the piston 64 may be obtained from respectively a barrel and a plunger of a medical syringe of the type readily available on the market.

Advantageously, the piston 64 is configured to slide along the inside of the cylindrical container 61 in a watertight and airtight manner in response to the pressure exerted by the pump 60. When the pump 60 draws the couplant from the couplant reservoir 59, the reduced pressure in the chamber 66 causes the piston 64 to move along the inside of the cylindrical container 61 following the outflow of the couplant toward the first opening 62. When the couplant is over, the pump rotation may be reversed to refill the couplant reservoir 59 from an external source.

It should be noted that the watertight and airtight design of the couplant reservoir 59 advantageously prevents any accidental introduction of air bubbles therein which would otherwise affect the supply of couplant to the couplant dispensing nozzle 57.

Referring to the example of FIGS. 10 and 11, the couplant dispensing nozzle 57 may be incorporated in the sensor mount 37, preferably adjacent to the NDT sensor 6.

The couplant dispensing nozzle 57 may comprise a couplant inlet 67 for receiving the couplant from the couplant dispensing device 56 and one or more couplant outlets 68 arranged around the NDT sensor 6.

In some embodiments, the couplant outlets 68 distal from the couplant inlet 67 are preferably larger than the couplant outlets proximal to the couplant inlet. This design advantageously allows homogenizing the outflow of couplant from the couplant outlets 68 regardless of the distance between the couplant inlet 67 and outlets 68.

Preferably, the couplant dispensing nozzle 57 comprises an annular groove 69 that surrounds the structure-engaging surface 24 of the NDT sensor so as to advantageously receive the couplant flowing out of the couplant outlets 68 and spread it around the NDT sensor.

Optionally, the UAV 1 comprises a localization sensor operatively connected to the NDT sensor 6 for annotating a measure obtained by the NDT sensor with corresponding localization data obtained by the localization sensor. The localization sensor may comprise a GPS sensor, a LIDAR system, a 3D depth camera and/or a barometer sensor.

In some embodiments, the use of a laser beam is contemplated to help direct the UAV 1 to a target position on the surface of the structure to be tested. The laser beam may be projected from a laser pointer fixed to the UAV and may assist in either manual or autonomous flight of the UAV.

An example of the operation of the UAV 1 is described below.

Before flying the UAV 1, the orientation of the surface 21 of the structure to be tested is possibly identified and the position/orientation of the arm 4 relative to the outer protective cage 2 is adjusted to best suit the orientation of the structure surface 21. Afterwards, the UAV 1 approaches the structure surface 21 in either manual or autonomous flight and puts the structure-engaging surface 23 of the second end 7 in contact with the structure surface 21. From the moment the magnets 38 engage with the structure surface 21 until the test operations are completed, the UAV 1 maintains its position in hovering flight adjacent to the surface under test. Any oscillations of the UAV 1 in this condition may be neutralized by the flexible section 8 of the arm.

The cleaning tool 42, if present, is preferably deployed before the NDT sensor 6. Starting from the first position of the tool-change mechanism 46, the second actuator 50 puts the cleaning tool 42 in contact with the structure surface 21 and the cleaning tool cleans a portion thereof. When the cleaning is completed, the second actuator 50 moves the cleaning tool 42 away from the structure surface 21 and then the first actuator 47 rotates the tool-change mechanism 46 to the second position. At this point, the second actuator 50 puts the NDT sensor 6 in contact with the cleaned portion of the structure surface 21 and, possibly, the pump 60 is run to dispense some couplant from the couplant outlets 68 thereby improving the transmission of acoustic waves between the NDT sensor and the structure surface. At this point, the NDT sensor 6 may perform a measurement, such as a thickness measurement.

Once the measurement is completed, the second actuator 50 may move the NDT sensor 6 away from the structure surface 21 or it may push it against the structure surface until the NDT sensor protrudes beyond the structure-engaging surface 23 of the second end so as to detach the magnets 38 from the structure surface.

The invention thus solves the proposed problem, achieving numerous advantages, including providing a versatile and reliable UAV capable of safely and efficiently performing precise non-destructive testing of a wide range of structures in hard-to-reach locations.

The invention claimed is:

1. An unmanned aerial vehicle for non-destructive testing comprising:
   an outer protective cage,
   a propulsion system mounted inside the outer protective cage and fixed thereto,
   an arm comprising a first end attached to the outer protective cage,
   a plurality of mounting supports fastened to the outer protective cage in respective spaced-apart fastening portions of the outer protective case, each one of the mounting supports are reversibly attachable to the first end, the first end is reversibly attached to a mounting support selected from the plurality of mounting supports, and a non-destructive testing sensor mounted at a second end of the arm, wherein the arm extends outward from the outer protective cage, the arm having a length between 1 and 50 percent of an overall linear dimension of the outer protective cage.

2. The unmanned aerial vehicle according to claim 1, wherein the outer protective cage has an at least partially spherical or spheroidal outer shape, the overall linear dimension of the outer protective cage is the diameter or the equatorial diameter of the at least partially spherical or spheroidal outer shape, respectively.

3. The unmanned aerial vehicle according to claim 1, wherein the arm extends along a longitudinal development from the first end to the second end, and wherein the length is measured along the longitudinal development of the arm.

4. The unmanned aerial vehicle according to claim 1, wherein the length of the arm is between 1 and 30 percent of the overall linear dimension of the outer protective cage.

5. The unmanned aerial vehicle according to claim 1, wherein the arm comprises a flexible section between the first end and the second end.

6. The unmanned aerial vehicle according to claim 5, wherein the flexible section comprises a spring, an elastomer and/or at least one adjustable joint.

7. The unmanned aerial vehicle according to claim 5, wherein the arm extends along a longitudinal development from the first end to the second end, the flexible section extending along the longitudinal development of the arm.

8. The unmanned aerial vehicle according to claim 5, wherein the arm extends along a longitudinal development from the first end to the second end, the flexible section comprising a coil spring extending along the longitudinal development of the arm and/or a plurality of adjustable joints connected in series along the longitudinal development of the arm.

9. The unmanned aerial vehicle according to claim 1, wherein the non-destructive testing sensor comprises an ultrasonic sensor.

10. The unmanned aerial vehicle according to claim 1, further comprising at least one magnet mounted at the second end, the at least one magnet securable to a surface of a structure for non-destructive testing.

11. The unmanned aerial vehicle according to claim 1, wherein the plurality of mounting supports comprises at least two mounting supports fastened to the outer protective cage in respective fastening portions thereof which are vertically and/or horizontally spaced apart from each other.

12. The unmanned aerial vehicle according to claim 1, wherein the arm comprises a cleaning tool for cleaning a surface of a structure for non-destructive testing.

13. The unmanned aerial vehicle according to claim 12, wherein the arm comprises a tool-change mechanism that reversibly positions selectively the cleaning tool or the non-destructive testing sensor in an operative configuration at the second end of the arm.

14. The unmanned aerial vehicle according to claim 1, further comprising a couplant dispensing system for delivering a couplant onto the non-destructive testing sensor.

15. The unmanned aerial vehicle according to claim 14, wherein the couplant dispensing system comprises a couplant dispensing device mounted inside the outer protective cage, a couplant dispensing nozzle arranged at the second end of the arm, and a tubing system for fluidly connecting the couplant dispensing device and nozzle.

16. The unmanned aerial vehicle according to claim 15, wherein the couplant dispensing device includes a couplant reservoir and a pump fluidly connected thereto for delivering the couplant from the couplant reservoir to the couplant dispensing nozzle.

17. The unmanned aerial vehicle according to claim 16, wherein the pump is peristaltic pump.

18. The unmanned aerial vehicle according to claim 16, wherein the couplant reservoir comprises a cylindrical container having a first opening that is fluidly connected to a suction side of the pump, and a second opening that is in fluidic communication with the external environment and thus subject to atmospheric pressure.

* * * * *